United States Patent Office 3,401,045
Patented Sept. 10, 1968

3,401,045
METHOD OF PREPARING PORK RIND
FOOD PRODUCTS
Parker P. Halpern, Wayland, Mass., assignor to Parker Products Inc., Holliston, Mass.
No Drawing. Filed July 15, 1965, Ser. No. 472,312
4 Claims. (Cl. 99—107)

ABSTRACT OF THE DISCLOSURE

The process of preparing green pork rinds to form an edible, wholesome food product is provided comprising rendering an aggregate of small pieces of green pork rinds in a fatty cooking liquid and curing the rind pieces in a liquid curing and flavoring medium. The flavored pieces are then dried to a hard and brittle state. The hard and brittle pieces formed can be popped in a heated liquid medium.

---

The present invention relates to a method of making a food product from pork rinds or skins and more particularly to a method of making a food product from pork rinds or skins, comprising popped chips of substantially uniform color, brittleness and expansion characteristics and which chips are substantially uniformly tender and crisp with uniformly consistent flavorable properties.

The use of pork rinds and skins to form popped chips is known. Such pork rinds and skins are usually obtained as scrap by-products of the meat industry. However, there has been considerable difficulty involved in providing popped chips from pork rinds or skins which chips are uniformly tender, crisp and of substantially consistent color, flavor and size. Particularly when green or untreated rinds and skins are used as a starting product, prior processes have resulted in the formation of chips of variable consistency in color, brittleness, toughness and expansion. In addition, such prior chips made from green rinds or skins lack a flavorable smoked taste.

An important object of this invention is to provide a method of making popped chips from pork rinds or skins, which chips are a readily saleable, edible finished product having substantially constant tender and crisp properties and which are tasty and easy to eat.

Another object of this invention is to provide a method in accordance with the preceding object which increases the expansion characteristics of popped chips so that a given weight of pork rinds or skins treated in accordance with the method of this invention produces a greater volume of finished chips than produced by other known methods.

Still another object of this invention is to provide a smoked food product manufactured in accordance with the method of this invention.

Still another object of this invention is to provide a method in accordance with the preceding objects which can be used for large scale production with reasonable cost.

According to the invention, green bacon rinds or pork skins are formed into an edible, wholesome food product by cutting the rinds or skins to form an aggregate of small pieces. The small pieces are rendered at a temperature in the range of from about 235°F. to 255° F. for a period of time sufficient to harden the rinds or skins and reduce their original size. Fat normally carried by the rinds or skins is liquified during rendering and can be removed and used in a subsequent frying step. After the rendering step, the rinds or skins are treated with a liquid curing and flavoring medium to impart desired smoke or other flavor to them. A drying operation follows the curing and returns the chips to a hard and somewhat brittle state. The dried pieces are then popped to form chips in a heated fluid medium, which can be the fat obtained in the rendering step, preferably at a temperature in the range of from about 400 to 425° F. After the last step, the popped chips are separated from the fluid medium and are found to have good uniformity in color, consistency and tenderness. It is a feature of this invention that hard, inedible or difficultly digestible popped chips are not produced. In addition, the flavor and taste of the chips can be varied and made consistent by the curing and flavoring step.

Preferably the first rendering step is carried out at a temperature in the range of from about 235° F. to about 255° F. for a period of time in the range of from about 50 to 70 minutes.

Throughout the following specification and claims, the term "rind" will be used to refer to both pork rind and pork skin in order to simplify the disclosure since both materials may be treated as described herein to achieve the desired results.

Other objects, advantages and features of the invention will become apparent to those skilled in the art during consideration of the following description of the preferred process and resultant product.

The pork rinds and skins useful in the process of this invention are preferably green or uncooked. The pork rinds are frozen to facilitate storage prior to use and cutting to proper size during the method of this invention.

In a first step frozen pork rinds with a minimum of attached fat are cut into pieces of the desired size. Preferably the pieces are substantially uniform having a length of approximately 1 to 2 inches and a width of ½ to 1 inch and a thickness of about $1/16$ inch and not more than $3/16$ inch. The specific size of the pieces may vary although it is preferred to use uniform pieces within the ranges mentioned to obtain most nearly uniform results. The pieces are rendered in a fatty fluid medium comprising the fat normally attached to the skins. The rendering is carried out for a period of approximately 50 to 70 minutes and preferably about 60 minutes. During the first 45 minutes of rendering, the temperature of the rendering fluid is held to a point where it will not fall below 240° F. and will not go above 245° F. even upon introduction of the frozen cut pieces. If the temperature is raised above 245° F., extremely hard unusable chips result. The cut pieces are preferably submerged entirely in a vat of the rendering fluid and kept in constant agitation at about 240° F. for the first 45 minutes to prevent matting and sticking together. The rendering fluid temperature is then raised to approximately 250° F. for about 15 minutes. The thickness of the fat normally occurring on the rind or skin may make some adjustment in time necessary. Preferably variations of temperature of ±5° F. and times of ±5 minutes should be maintained. Greater variations in temperature tend to adversely affect the finished product. In some cases where thick layers of fat are attached to the rind or skins, slightly longer time periods may be employed. The rendered fat is constantly drained from the rendering pot or vessel and later used in the frying procedure.

In a second step, after the rendering procedure has proceeded to a point where the pieces are reduced in size to about ½ their area, and if cooled are extremely hard and difficult to break, the pieces are removed from the fluid filled vat and put into an aqueous curing and flavoring solution. The curing and flavoring solution may vary in its composition depending upon the desired final flavor. Known curing and flavoring agents may be used to flavor the cooked pieces as desired. The use of an aqueous curing and flavoring solution at this point in the process is important to consistently achieve controlled flavoring.

A particularly desirable curing and flavoring solution comprises a mixture of salt, sugar, paprika, sodium nitrate and sodium nitrite. This solution is preferably maintained at approximately 65 to 75° F. and the cooked pieces are soaked for preferably 1 hour. It is emphasized that the time and temperature period given here is solely determined upon the final taste and flavor desired. More time could mean a longer drying time in the following steps while less time could reduce the flavor given to the pieces.

In some cases natural smoke flavor, which is a commercial ingredient made by passing steam over burning wood and condensing the steam, can be added to the curing and flavoring solution to give a smoked taste to the resultant chips.

In a subsequent step the rind pieces are removed and drained at room temperature and then placed in a drying chamber and slowly dried to remove water and moisture content. Drying may be accomplished at temperatures up to about 160 to 165° F. for periods at least as long as 1 hour until the pieces are dried and are hard and brittle.

In a final step, the hard pieces are popped into chips by introducing them into a cooking fluid medium which may be the fat obtained during rendering or other lard or known vegetable oils and shortenings preferably at a temperature in the range of from about 400° to 425° F. for periods of about 1 minute. The time period may vary depending upon the size of the chips as may the temperature. As the pieces begin to pop they tend to float. In the popping process floating chips are constantly agitated to allow them to alternately submerge and rise to the top until they have completely expanded or popped out. After the popping procedure is completed the chips are again drained and may be salted to taste.

In a specific embodiment of this invention, 850 pounds of frozen green pork rinds are cut into substantially uniform pieces having a size of 1¼ inches in length, ¾ inch in width and ⅛ inch in thickness. The cut pieces are rendered in a vat at a temperature such that introduction of the pieces causes a resulting mixture to be maintained at 240° F. The cut pieces are submerged and kept in constant agitation for 45 minutes whereupon the temperature is raised to 250° F. for 15 minutes. The cooked pieces are removed from the vat and drained after the 15 minute period and are found to have been reduced in size by approximately 50%.

The rendered pieces are then put into a curing and flavoring solution. The solution is made by adding ten pounds of a mixture of:

| | Parts |
|---|---|
| Salt | 352 |
| Sugar | 80 |
| Paprika | 4 |
| Sodium nitrite | 1.65 |
| Sodium nitrate | .1 | to 24 gallons of water and to this is added 16 pounds of natural smoke flavor.

After 1 hour in the curing and flavoring solution at 70° F. the cut chips are removed and drained and allowed to remain at room temperature for 1 hour. The cooked pieces are then placed in a drying chamber for 3 hours at 165° F. after which they are found to be dry, hard and brittle. The hard pieces are popped into chips by introducing them into a fat vat maintained at a temperature of 400° F. and allowing them to remain in the vat for 45 seconds. After the popping procedure the chips are found to have substantially uniform sizes of 1½ inch length, 1 inch width and 3/16 inch thickness.

The resultant chips have a weight of 450 pounds and are salted to provide a tasty, uniformly colored, smoked, appetizing food product.

While specific embodiments of this invention have been shown and described, it should be understood that many controlled variations thereof are possible. The specific sizes, temperatures and times may vary with differences in starting product although the times, temperatures and sizes set forth are preferred and do provide outstanding results. It is a feature of this invention that although the starting materials are green, the resulting chips are flavored as are chips made from precured and smoked rinds to provide a desired uniform flavor to the user.

This invention is to be limited only by the spirit and scope of the following claims.

What is claimed is:

1. A process of preparing green pork rinds to form an edible, wholesome food product said process comprising,
   cutting green pork rinds to form an aggregate of small pieces,
   rendering said rind pieces in a fatty cooking liquid at a temperature in the range of from about 240° F. to about 245° F. for about 45 minutes while constantly agitating said rind pieces and then the raising of the temperature to about 250° F. and continuing rendering until the small pieces have a size of about one-half their original size and are hardened,
   curing said rind pieces in a liquid curing and flavoring medium,
   drying said rind pieces to a hard and brittle state,
   popping said hard and brittle pieces to form chips by introducing said pieces into a cooking fat medium.

2. In a method of preparing green pork rinds to form edible, wholesome food products made by the steps of rendering, curing, flavoring, drying, and popping, the improvement comprising, rendering pieces of said green pork rind in a cooking liquid at a temperature in the range of from about 240° F. to about 245° F. for about 45 minutes and then raising the temperature to about 250° F. and continuing rendering until the small pieces of pork rind have a size of about one-half their original size and are hardened.

3. In a method as set forth in claim 2, the further improvements comprising curing and flavoring said rind pieces in an aqueous smoke flavoring solution and drying said pieces at a temperature up to about 165° F. for at least one hour.

4. A method in accordance with the method of claim 3 wherein said curing and flavoring is carried out at a temperature of from about 65° to 70° F. for a period of about one hour.

References Cited

UNITED STATES PATENTS

| 2,179,616 | 11/1939 | Darrow | 99—107 |
| 2,345,463 | 3/1944 | Cox | 99—107 |
| 2,562,850 | 7/1951 | Winslow | 99—107 |
| 2,907,660 | 10/1959 | O'Brian et al. | 99—107 |
| 2,974,047 | 3/1961 | Holmes | 99—159 X |

FOREIGN PATENTS 611,660 11/1948 Australia.

HYMAN LORD, *Primary Examiner.*